(12) United States Patent
Yu

(10) Patent No.: US 10,501,180 B2
(45) Date of Patent: Dec. 10, 2019

(54) MULTIFUNCTION FIREFIGHTING INFRASOUND, HAILSTONE, PLANT POLLINATION DRONE APPARATUS AND METHOD

(71) Applicant: Simon Siu-Chi Yu, Oakland, CA (US)

(72) Inventor: Simon Siu-Chi Yu, Oakland, CA (US)

( * ) Notice: Subject to any disclaimer, the term of this patent is extended or adjusted under 35 U.S.C. 154(b) by 0 days.

(21) Appl. No.: 15/987,307

(22) Filed: May 23, 2018

(65) Prior Publication Data

US 2019/0100311 A1    Apr. 4, 2019

Related U.S. Application Data

(63) Continuation-in-part of application No. 15/724,943, filed on Oct. 4, 2017, now Pat. No. 9,999,213.

(60) Provisional application No. 62/761,526, filed on Mar. 27, 2018.

(51) Int. Cl.
*B64C 39/02* (2006.01)
*A01M 29/16* (2011.01)
*A62C 99/00* (2010.01)
*H04R 1/30* (2006.01)
*A62C 3/02* (2006.01)
*H04R 1/40* (2006.01)
*A62C 29/00* (2006.01)
*H04R 1/02* (2006.01)

(52) U.S. Cl.
CPC .......... *B64C 39/024* (2013.01); *A01M 29/16* (2013.01); *A62C 3/02* (2013.01); *A62C 3/0228* (2013.01); *A62C 99/009* (2013.01); *H04R 1/30* (2013.01); *H04R 1/40* (2013.01); *A62C 29/00* (2013.01); *B64C 2201/12* (2013.01); *H04R 1/028* (2013.01); *H04R 2217/03* (2013.01)

(58) Field of Classification Search
CPC .. B64C 39/024; B64C 2201/12; A01M 29/16; A62C 3/02; A62C 3/0228; A62C 99/009; A62C 29/00; H04R 1/30; H04R 1/40; H04R 1/028; H04R 2217/03
USPC ................................. 169/53, 54, 56, 46, 70
See application file for complete search history.

(56) References Cited

U.S. PATENT DOCUMENTS 9,907,987 B1* 3/2018 Hossameldin ......... A62C 37/40
2010/0059236 A1* 3/2010 Yee ....................... A62C 99/009
169/46

(Continued)

*Primary Examiner* — Steven J Ganey
(74) *Attorney, Agent, or Firm* — Lyman Moulton, Esq.; Moulton, Patents PLLC

(57) ABSTRACT

A first drone equipped with a high energy Directional Ultrasound Parametric Speaker Array and a second drone equipped with an Acoustic Dispersion Cannon are used to fight wildfire. The first drone is distanced far from a burning flame but in close proximity to a fire target. Both drones are guided by GPS to communicate with remote operators. Once the target is locked, the first drone blasts the target with Amplitude Modulated Ultrasound. The Ultrasound is self-demodulated into a lower frequency audio sound when it encounters a hot flame of richly charged ions. The lowered frequency sound pushes and pulls the flame forward and backward rapidly away from the combustion source, causing it to be disconnected from the flame which instantly cools down and is extinguished. The second drone blasts the combustible source with powerful sonic shockwaves to disperse the still hot particulates further apart to prevent the source being reignited.

18 Claims, 9 Drawing Sheets

(56) References Cited

U.S. PATENT DOCUMENTS

2017/0092109 A1* 3/2017 Trundle .............. B60L 11/1824
2018/0147429 A1* 5/2018 Won ........................ A62C 3/00

* cited by examiner

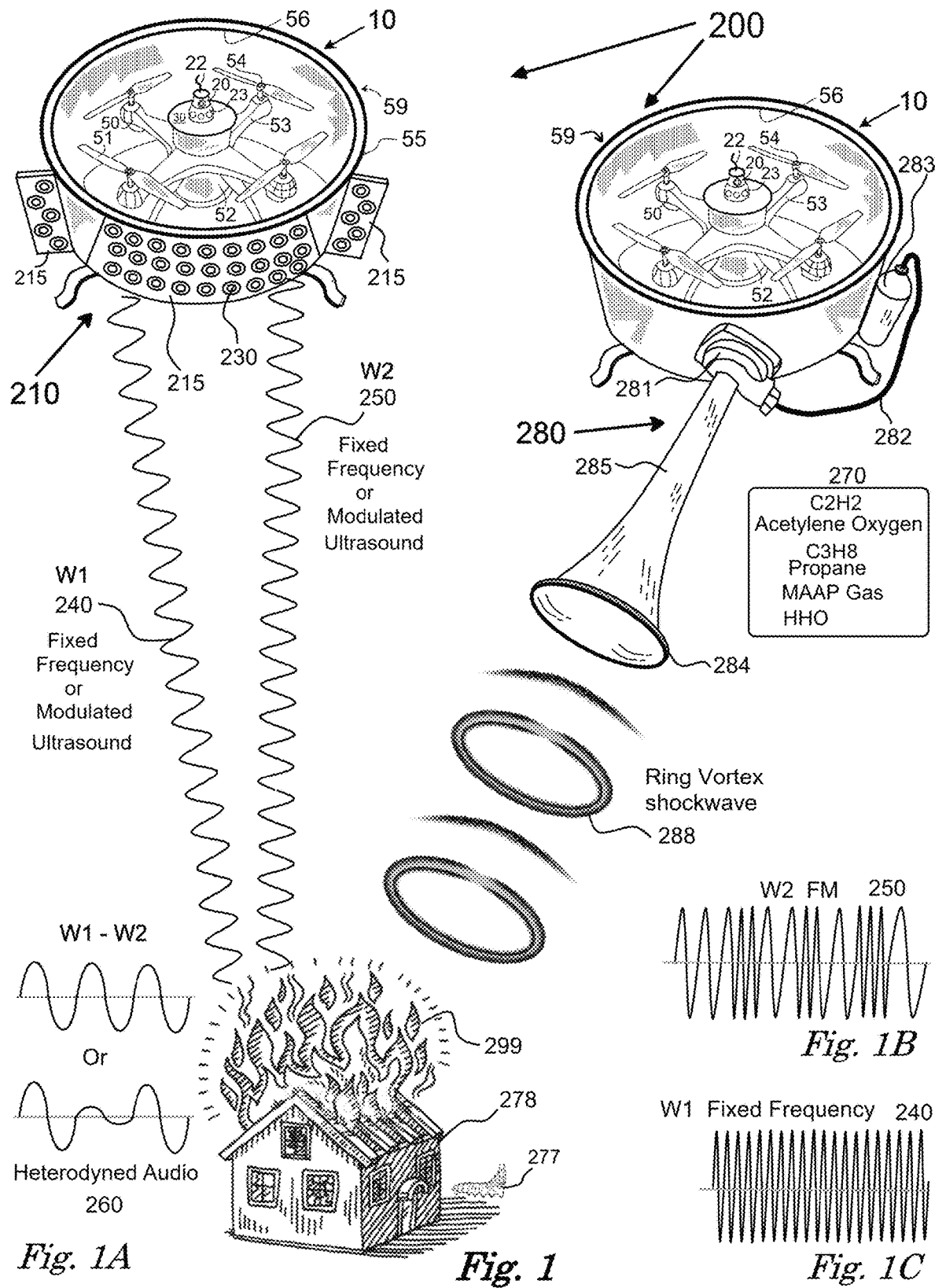

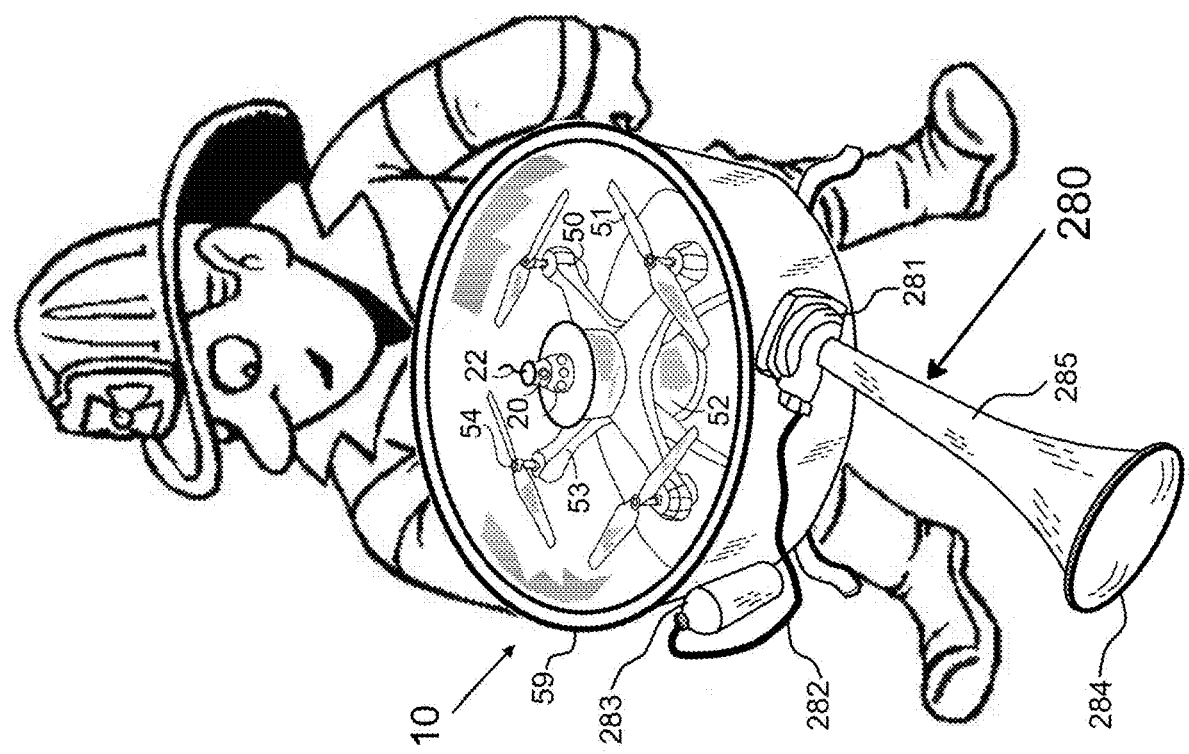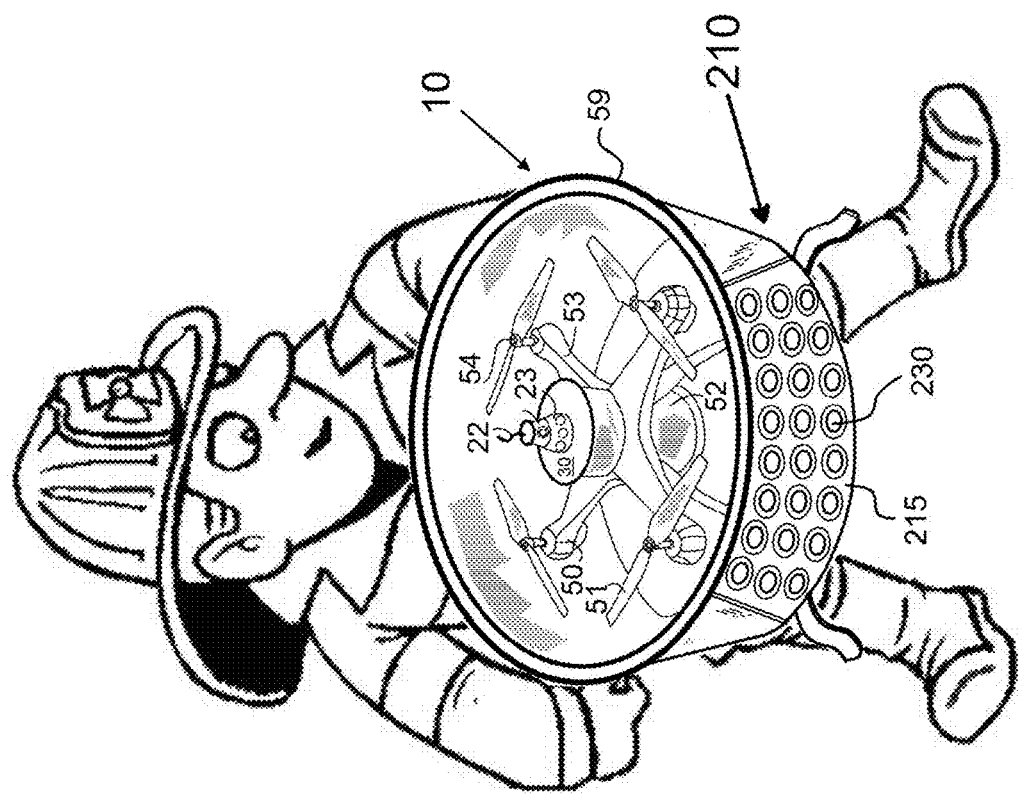
Fig. 1D

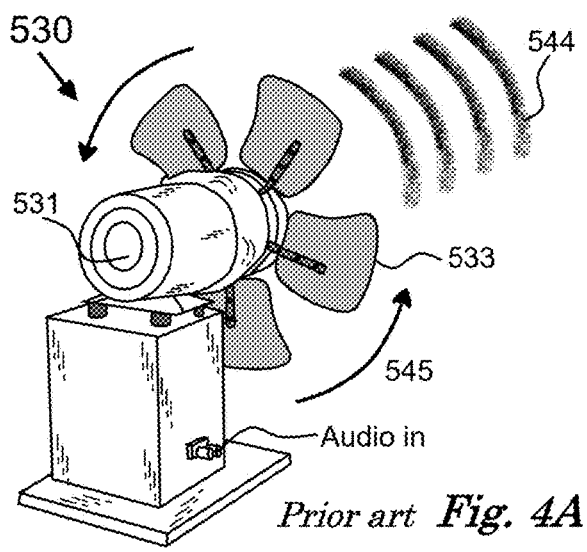
Prior art *Fig. 4A*
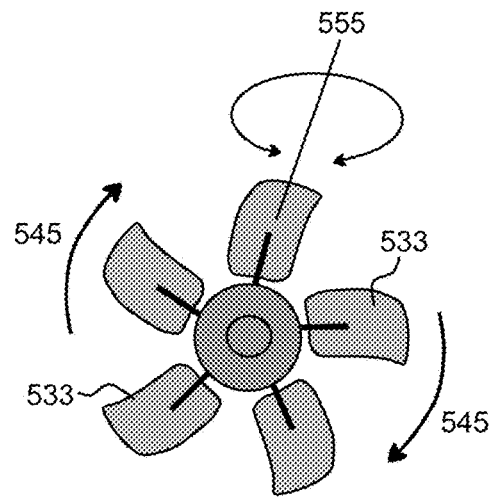
Prior art *Fig. 4B*
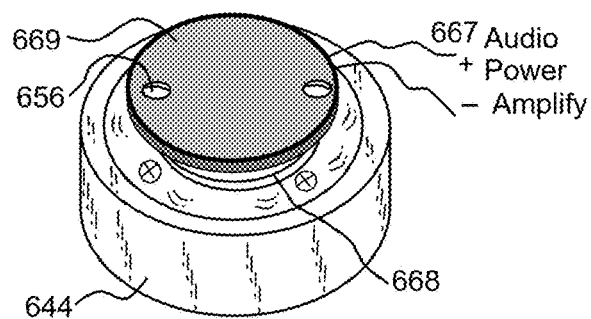
*Fig. 5D*
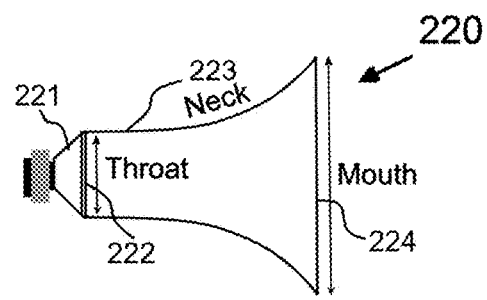
Prior art *Fig. 1E*
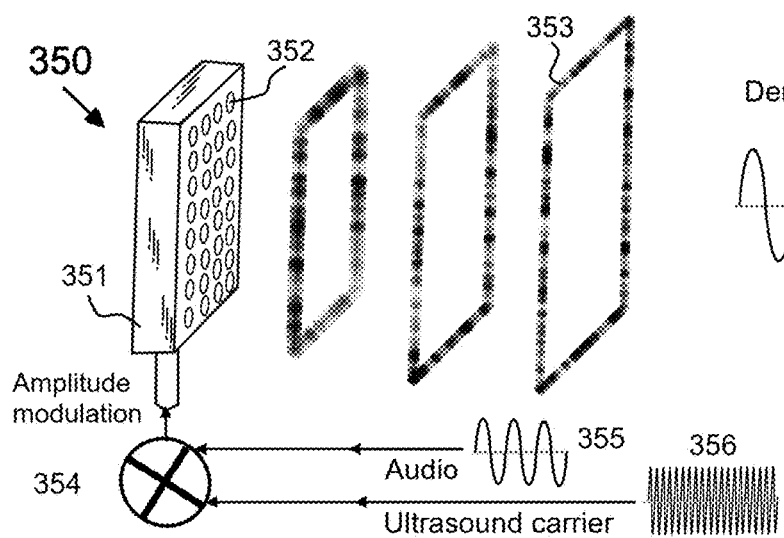
Prior art *Fig. 2E*

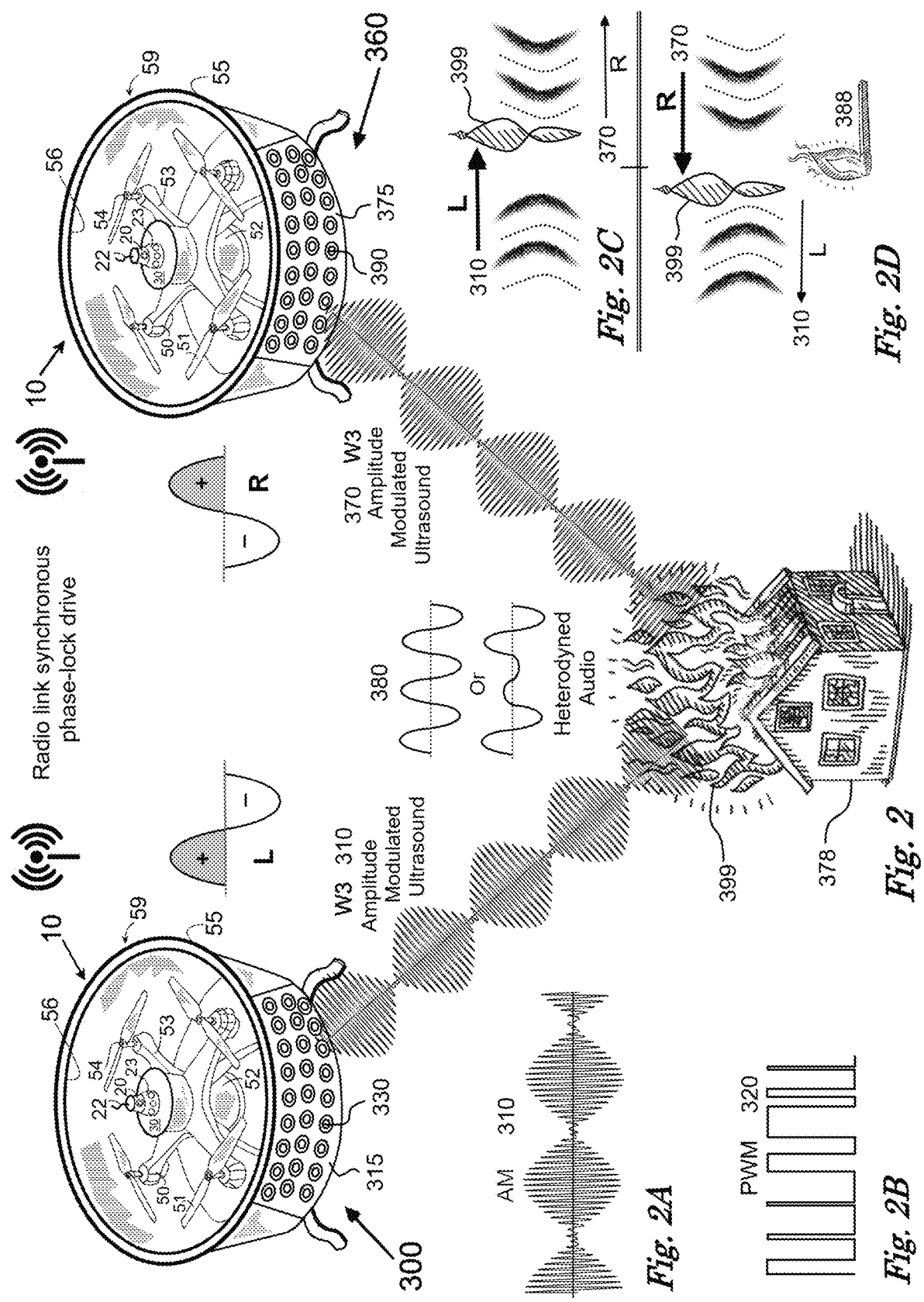

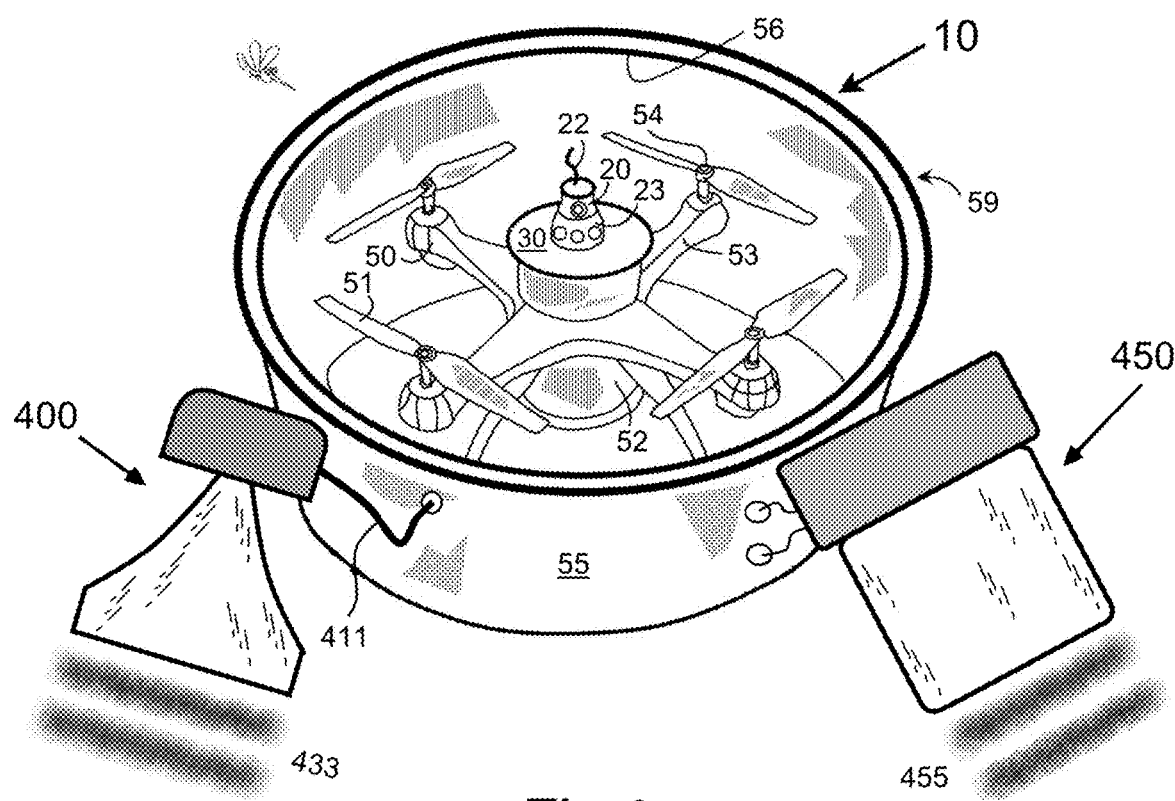
Fig. 3
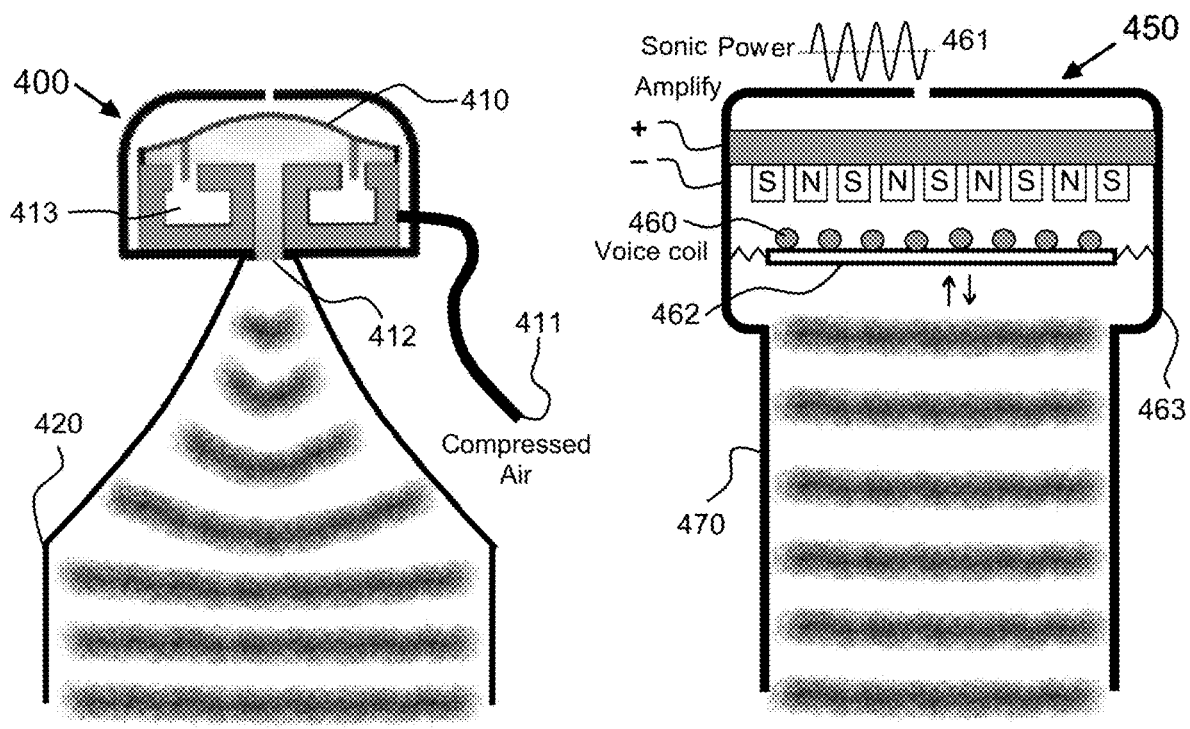
Fig. 3A
Fig. 3B

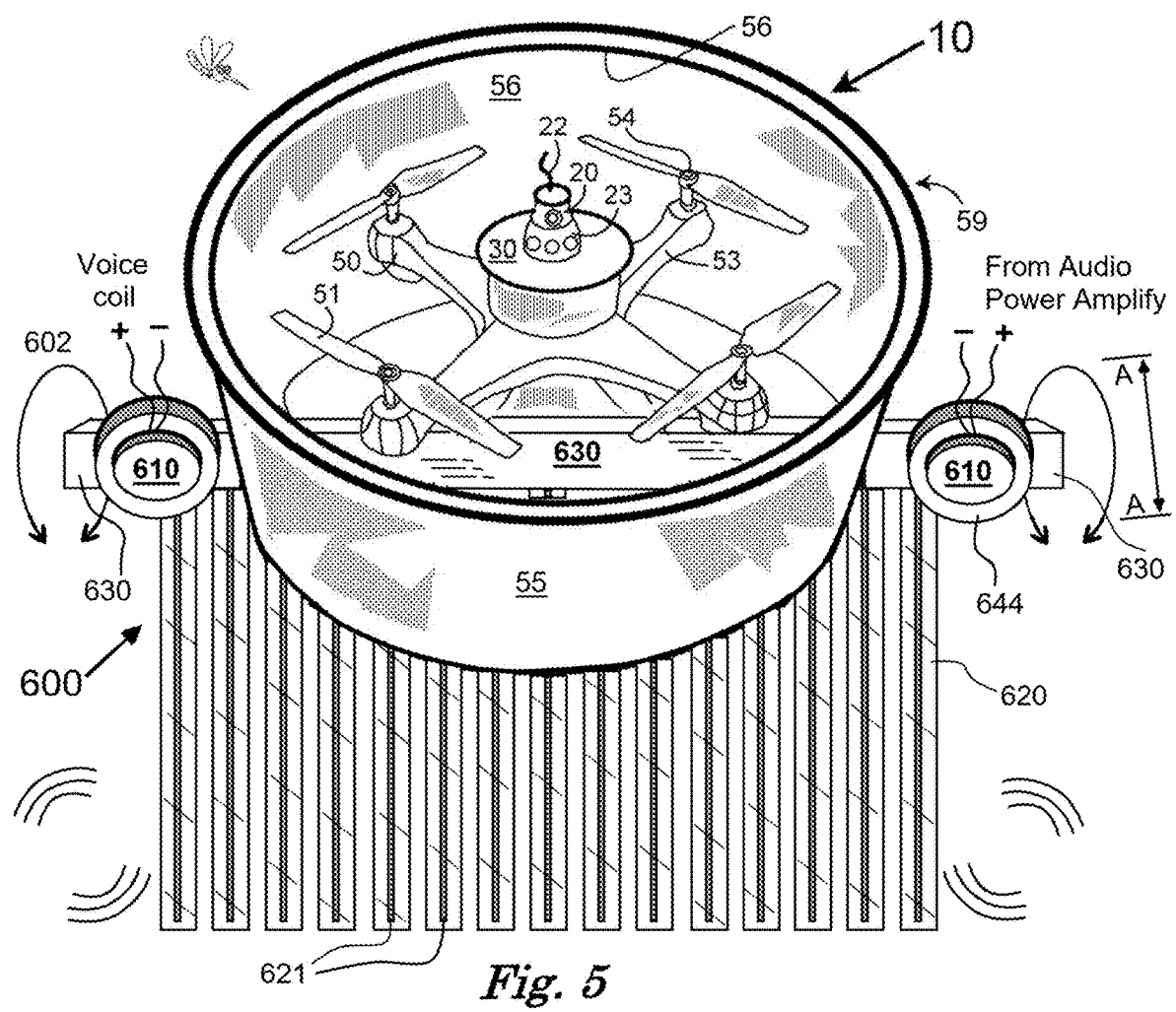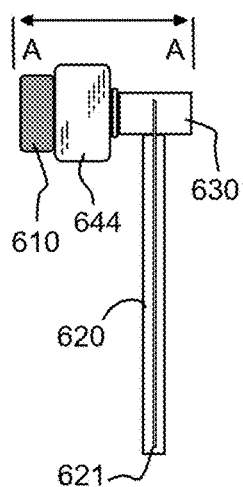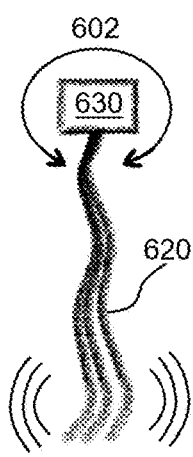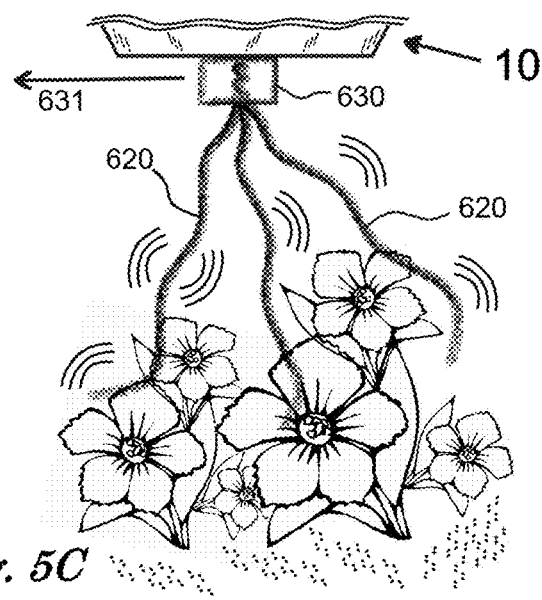
Fig. 5
Fig. 5A  Fig. 5B  Fig. 5C

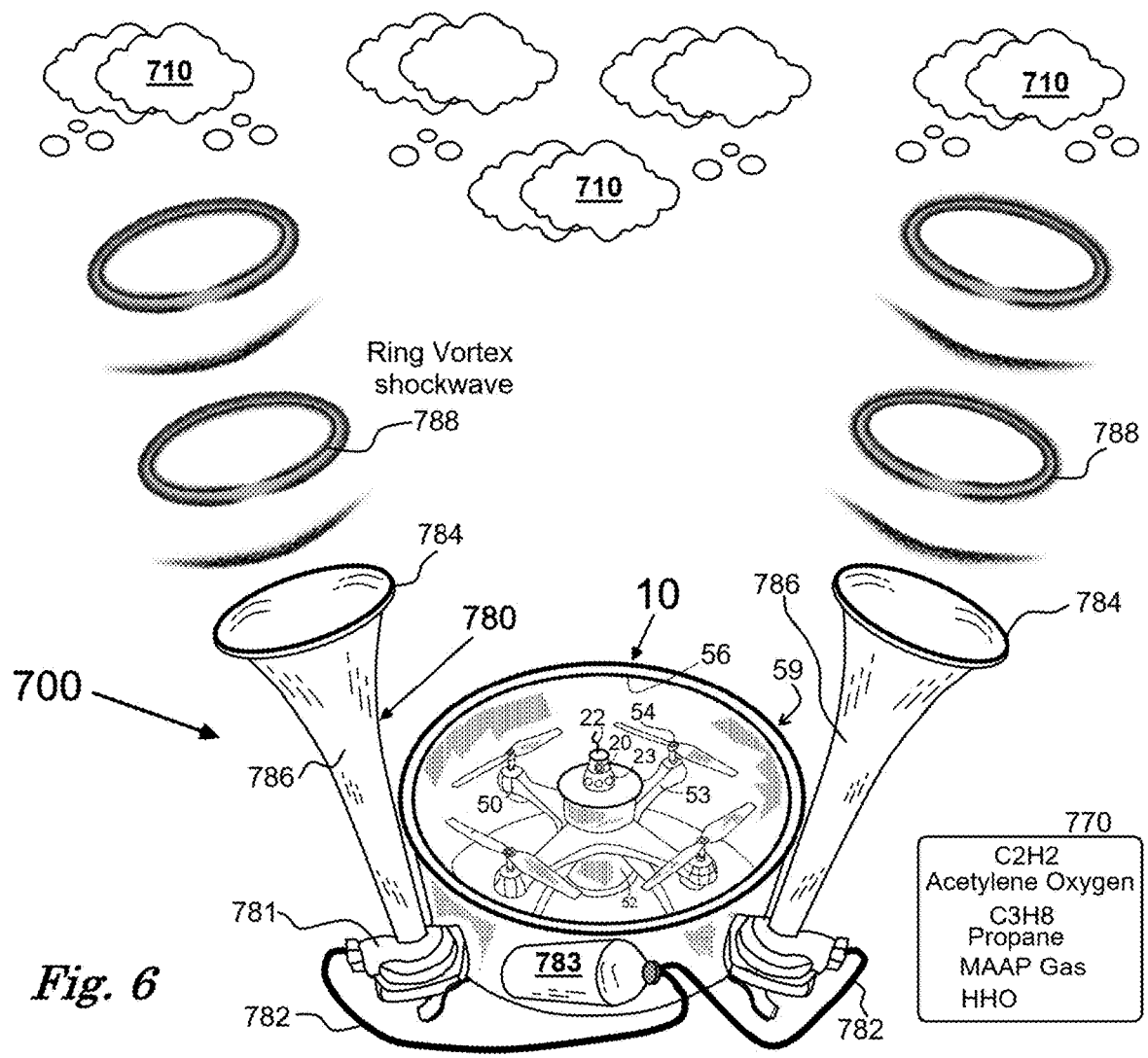
*Fig. 6*
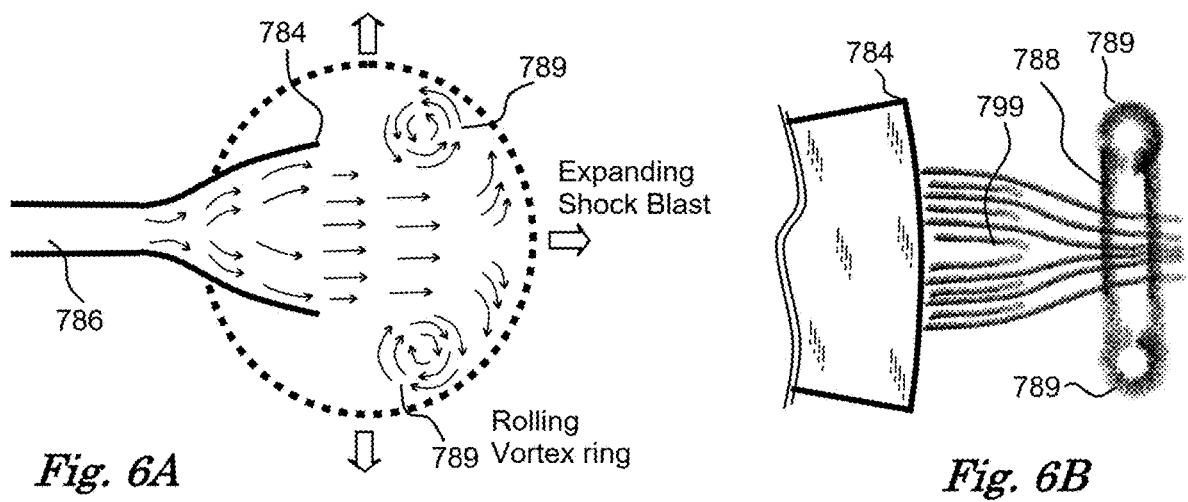
*Fig. 6A*  *Fig. 6B*

MULTIFUNCTION FIREFIGHTING INFRASOUND, HAILSTONE, PLANT POLLINATION DRONE APPARATUS AND METHOD

CROSS-REFERENCE TO RELATED APPLICATION

This application claims benefit of Provisional Application 62/761,526 filed Mar. 27, 2018 by Simon Siu-Chi Yu and is a continuation-in-part (CIP) of allowed non-provisional patent, application Ser. No. 15/724,943 filed Oct. 4, 2017 also by Simon Siu-Chi Yu, which claims priority to Provisional application No. 62/601,652 filed Mar. 25, 2017 titled 'Multi Function Photo Electro Acoustic Ions Drone' which is a continuation-in-part of and claims priority to issued U.S. Pat. No. 9,807,996 titled 'Bug Eater' and its associated Provisional patent application No. 62/392,341 filed on May 28, 2016 also titled 'Bug Eater' by Simon Siu-Chi Yu who claims the benefit of the earliest filing date of all the aforementioned applications incorporated herein by reference, each in its entirety.

BACKGROUND OF THE INVENTION

Fighting fires has always been risky, but to combat fires in a forest, surrounded by thousands of acres of combustible fuel for the blaze, is another thing entirely. Wildfires are really an unpredictable force by nature. Wildfires can leap across highways, create their own winds and can move at speeds faster than a human can run.

To sustain itself, a fire needs three elements, heat-oxygen-fuel. Missing any one of these elements, a fire will extinguish itself. Air contains 21% oxygen typically. It is a physical principle that a combustion process cannot sustain a fire if the percentage of oxygen present in the air is less than 11%. Fire extinguishers are made to break one or more of the three elements by smothering the oxygen or coating a layer of powder or foam on fire or cool down the combustible fuel.

However, in a wide open, a wildfire most often occurs in hot and dry summer season where water is difficult to obtain. A Fire truck often cannot reach its target in the wilderness and therefore any fire extinguishers a fire truck renders are useless. Left untreated, the wildfire continuous to burn until all combustible fuel exhausted.

Aerial bombardment with water and fire retardant are therefore often called in to fight a wildfire. It is a very dangerous operation since there are no air traffic controllers to guide pilots and thick smoke fills the skies and drastically reduces their visibility.

On the other hand, sending ground base fire fighters close to a wilderness target seems a suicide mission in most of wildfires. This invention offers a more advanced solution to deal with wildfires and conventionally hard to reach fires.

SUMMARY OF THE INVENTION

An unmanned aerial vehicle drone (UAVD) comprises a sound wave generator configured to direct sound waves onto a flaming source to extinguish the flame via compression waves and rarefaction waves configured to push and pull the flame faster than the source can maintain the flame. The UAVD also includes a sound wave controller configured to control the sound wave generator to generate one of a fire extinguishing frequency, a harmonic frequency for disruption of insect pests, rodents and subterranean pests, hailstone formation and for pollinating plants by vibration. The UAVD additionally includes a control and communications module comprising an electronic central processing unit (CPU), a wireless communication unit, an electronic camera and audio A/V unit and a bus configured to interconnect all drone modules. The UAVD further includes a navigation module comprising a set of 360 degree obstacle avoidance sensors and positioning unit (GPS) configured to autonomously direct the drone to avoid obstacles while in flight.

A Unmanned Aerial Vehicle Drone (UAVD) method comprises directing sound waves onto a flaming source via a sonic wave generator to extinguish the flame via compression waves and rarefaction waves configured to push and pull the flame faster than the source can maintain the flame. The method also comprises controlling a sound wave via a sound wave controller configured to generate one of a fire extinguishing frequency, a harmonic frequency for disruption of insect pests, rodents and subterranean pests, hailstone formation and for pollinating plants by vibration. The method additionally comprises controlling a communications of the UAVD via a controlling and a communications module comprising an electronic central processing unit (CPU), a wireless communication unit, an electronic camera and audio A/V unit and a bus configured to interconnect all drone modules. The method further comprises navigating the UAVD via a navigation module comprising a set of 360 degree obstacle avoidance sensors and positioning unit (GPS) configured to autonomously direct the drone to avoid obstacles while in flight.

Other aspects and advantages of embodiments of the disclosure will become apparent from the following detailed description, taken in conjunction with the accompanying drawings, illustrated by way of example of the principles of the disclosure herein.

BRIEF DESCRIPTION OF THE DRAWINGS

FIG. 1 is an illustration of a fire fighting drone system comprising a directional parametric ultrasound speaker array and a sonic shockwave ring vortex Acoustic Dispersion Cannon to extinguish fire from long-range in accordance with an embodiment of the present disclosure.

FIG. 1A is the resultant audio wave of Heterodyning two ultrasound waves in accordance with an embodiment of the present disclosure.

FIG. 1B is an ultrasound frequency modulation of an audio signal in accordance with an embodiment of the present disclosure.

FIG. 1C is an ultrasound carrier frequency in accordance with an embodiment of the present disclosure.

FIG. 1D is a fire fighting drone system used as a portable fire extinguisher in accordance with an embodiment of the present disclosure.

FIG. 1E is an alternative fire-fighting drone system using an ordinary audio horn mountable on the drone according to an embodiment of the present disclosure.

FIG. 2 is a fire fighting dual drone system working in a push-pull bride configuration with two self-demodulated audio waves tuned out of phase to boost fire controlling effectiveness in accordance with an embodiment of the present disclosure.

FIG. 2A is an amplitude modulated ultrasound in accordance with an embodiment of the present disclosure.

FIG. 2B is a pulse width modulated ultrasound in accordance with an embodiment of the present disclosure.

FIG. 2C is a graphic illustration of the left drone and a positive phase compression wave pushing a flame to the right in accordance with an embodiment of the present disclosure.

FIG. 2D is a graphic illustration of the right drone and a positive phase compression wave pushing a flame to the left, the flame oscillating too fast and the combustion source unable to catch up with flame movements extinguishing the fire in accordance with an embodiment of the present disclosure.

FIG. 2E is a conventional parametric speaker used for music listening or for crowd control during a riot in accordance with an embodiment of the present disclosure.

FIG. 3 is a drone system comprising an air horn for compressing air and an electromagnetic speaker horn for producing high pressure sound waves in accordance with an embodiment of the present disclosure.

FIG. 3A is a compressed air operated horn used for dislodging pests from plants and extinguishing small fires at a close distance in accordance with an embodiment of the present disclosure.

FIG. 3B is a voice coil operated electromagnetic speaker horn for dislodging pests from plants and extinguishing small fires at a close distance in accordance with an embodiment of the present disclosure.

FIG. 4A is a conventional infrasound generating machine.

FIG. 4B shows a method to produce infrasound by adjusting the pitch angle on the fan blades while the fan is spinning in accordance with an embodiment of the present disclosure.

FIG. 5 is a plant pollinator drone via a vibration curtain made of vanes sweeping across plants to mimic visiting bees to cause plants to release their pollens in accordance with an embodiment of the present disclosure.

FIG. 5A is a side view of a vibration curtain assembly in accordance with an embodiment of the present disclosure.

FIG. 5B is the curtain bar vibrating the vane at power on motion in accordance with an embodiment of the present disclosure.

FIG. 5C shows the pollinator drone moving and transferring vibrations to the plants in accordance with an embodiment of the present disclosure.

FIG. 5D is a shaker module power by audio signal through a voice coil similar to a speaker in accordance with an embodiment of the present disclosure.

FIG. 6 is a hailstone cannon drone equipped with combustible gas powering the cannons via powerful sonic shockwaves which break up cloud formation to prevent hailstone in accordance with an embodiment of the present disclosure.

FIG. 6A is an illustration of a diagram forming of a shockwave along with a vortex ring in accordance with an embodiment of the present disclosure.

FIG. 6B is a side view of a moving vortex ring traveling at a speed of 200 miles (330 km) per hour in accordance with an embodiment of the present disclosure.

Figure 4:
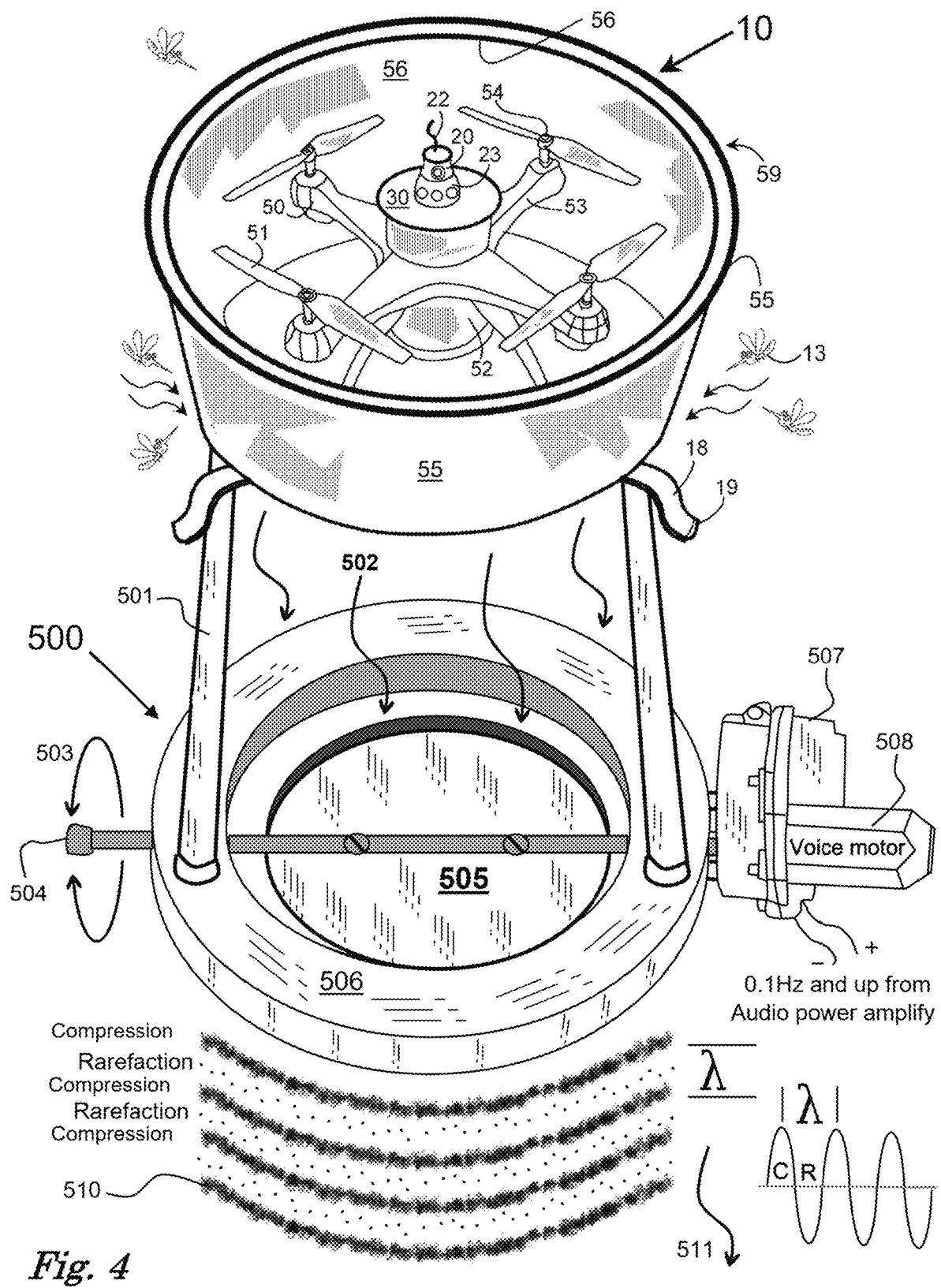
FIG. 4 is an infrasound drone operable by modulating high pressure propellers and a down draft to create infrasound used for evicting subterranean agricultural pests in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the terms "heterodyne" refers to generating a lower frequency audio wave or beat from a difference of two waves of compressed air and rarefaction air. The terms 'infrasound' and 'ultrasound' refer to compression and rarefaction waves respectively slower than and greater than the range of human hearing. The term 'diffraction limit' refers to the minimum angular separation of two sonic sources that can be sonically distinguished depending on a wavelength of the sound blast to be generated by heterodyne methods.

Sound travels in air in longitudinal waves. Sound waves are directional if the width of the wave front is much larger than the wavelength. In FIG. 1E shows a loud speaker 221 with a throat 222 of 8 inches (20 cm) wide, its horn neck 223 length is 178 inches (453 cm) and its horn mouth 224 is 134 inches (340 cm). These dimensions produce a nominal directional wave front at frequency at 50 hertz. Since sound waves dissipate in air it is important to bring a source of the sound waves as close as practically possible to the desired target, hence drone delivery.

In this disclosure, sound waves are utilized to extinguish fire from a relatively far-distance for safety. From the above example calculated from physics principles, using an ordinarily long horn 220 is impractical.

Therefore, ultrasonic waves are employed for fire extinguishing. Ultrasound moves in a much narrower beam straight to a target and does not follow the inverse-square law that spreads out audio waves. Ultrasound has a much smaller wavelength—about 0.34 inch (8.5 mm) at 40 kHz—so reasonably sized speakers will produce a directional wave front. Also Ultrasound causes water cavitations that generate micro bubbles and scattering mists in burning surroundings.

FIG. 1 is an illustration of a fire fighting drone system comprising a directional parametric ultrasound speaker array and a sonic shockwave ring vortex Acoustic Dispersion Cannon to extinguish fire from long-range in accordance with an embodiment of the present disclosure. FIG. 1 includes a drone 10 integrated with a high power, preferably 500 watts to a few kilo watts, directional speaker 210 which blasts at flame 299 of a house 279 which comprises an ultrasound array 215 with multiple individual ultrasound transducers 230. The ultrasound W1 240 superimposed with frequency modulated ultrasound W2 250, encounters a house 278 in its path creating new lowered audio sound wave 260 or beats from a heterodyning effect as the difference of the two waves. Low frequencies in the range of 50 to 100 hertz are more effective.

FIG. 1A is the resultant audio wave of heterodyning two ultrasound waves in accordance with an embodiment of the present disclosure. The sound wave 260 oscillates the flame 299 forward and backward at a high rate of fluctuations causing the ionized flame 299 to disconnect from its combustible source and rapidly cools down and thus extinguishes the fire. Although the fire is out, the combustible source is still hot. The second drone 10, integrated with an acoustic dispersion cannon 280, comprises horn neck 385 and combustion chamber 281. A combustion gas tank 283 delivers gas to chamber 281 via hose 282. When the gas detonated, a sonic vortex shockwave 288 rushes out the horn month 284 at a speed of 200 MPH (330 km) dispersing the still hot embers further apart. The spread out embers thus reduce the ember's temperature and prevent re-ignition of the combustible source. Gas 270 can be acetylene and the like.

FIG. 1B is an ultrasound frequency modulation FM of an audio signal in accordance with an embodiment of the present disclosure. Wave form W2 is modulated onto an audio carrier frequency and results in the wave 250. Periods of higher frequency and lower frequency effectuate compression and decompression to generate a shock wave for extinguishing fires.

FIG. 1C is an ultrasound carrier frequency in accordance with an embodiment of the present disclosure. The modulation of the audio waves of FIG. 1A onto the fixed frequency carrier wave 240 results in a frequency modulated wave for fire control.

The system 200 is light weight, and can be handheld operated to fight ground fires as shown in FIG. 1D by fireman, emergency personnel and even the general public with some instructions included in accordance with an embodiment of the present disclosure. Override mechanisms are also used to manually operate the various functions of the drones without radio or electromagnetic wave control.

FIG. 1E is an alternative fire-fighting drone system using an ordinary audio horn mountable on the drone according to an embodiment of the present disclosure. The audio horn 220 includes a diaphragm 221, a throat 222, a neck 223 and a mouth 224. The audio horn creates wave disruptions capable of performing work at a distance including resonant vibrations, pollinations, and air disruptions.

Turning to FIG. 2, a fire-fighting dual drone system working in a push-pull bride configuration with two self-modulated audio waves tuned out of phase to boost fire controlling effectiveness in accordance with an embodiment of the present disclosure. The dual system employs drones 300 and 360. The dual drone system radio links drones 300 and 360 to ensure the two resultant audio waves 380 are out of phase and achieves maximum force to manipulate the movement of the flame 399. The system drone 300 includes the ultrasound speaker array 315 and the ultrasound transducers 330. The system drone 360 includes speaker array 375 and the ultrasound transducers 390. The two system drones 300 and 360 hover in opposite directions to aim at the house 378.

FIG. 2A is an amplitude modulated AM ultrasound wave in accordance with an embodiment of the present disclosure. The amplitude of the AM wave 310 is modulated rather than the frequency. Other modulations in amplitude occur depending on the nature of the disruption desired from the drone. FIG. 2B is a pulse width modulated ultrasound wave in accordance with an embodiment of the present invention.

During the positive cycle, the sound wave 380 is as shown in FIG. 2C which is a graphic illustration of the left drone and a positive phase compression wave pushing a flame to the right in accordance with an embodiment of the present disclosure. The compressed air generates a higher pressure wave W3 310 which pushes the flame 399 toward the lower pressure rarefaction air generated from inverted wave W3 370. On the next half cycle, the wave 380 and the flame 399 reverse direction as shown in FIG. 2D in accordance with an embodiment of the present disclosure. The combustible source 388 is unable to keep up with the rapidly oscillating flame 399 so the fire is extinguished.

FIG. 2E is a conventional parametric wave 358 used for music listening or for crowd control during a riot in accordance with an embodiment of the present disclosure. That ultrasound 353 naturally self-demodulates into audio sound 358 was discovered long ago when short pulses of ultrasound were fired into water and then later also in air due to a non-linear air impedance when sound propagates as shown on FIG. 2E. It is ideal to use ultrasound to blast a fire target from a far-distance and let the self-demodulated lower frequency audio sound extinguish the burning fire. Also, the Directional Parametric Ultrasound speaker array, included in the firefighting drone, eradicates plant based agricultural pests such as caterpillars 277. The idea is projecting at long-range, modulated ultrasound waves, to the plants infected with caterpillars. The ultrasonic waves self-demodulate to audio waves that fluctuate in large amplitude and cause plant leaves to vibrate. In addition to the audio waves, a remnant of the ultrasound waves cause cavitations within a caterpillar's body to implode. The caterpillars will either fall to ground or die when their body resonates with a frequency of the sonic waves.

When one shakes a match violently, he or she moves the fire away from its source of fuel. When one moves the match very quickly, the source of fuel moves faster than the flames can readjust course. In addition when one moves the fuel source away from the flame, the fuel source cools down rapidly and the combustion reaction is no longer sustainable and will no longer be able to take place.

Turning to FIG. 3, an air horn drone system includes horns 400 and 450. Air horn 400 includes vibration diaphragm 410, air chamber 413, horn throat 412 and horn waveguide 420. When compressed air is delivered via hose 411, diaphragm 410 resonances at the single frequency 433 that dislodges pests from plants and is used to fight small fires. In some situations, a wider range of vibration frequencies cannot be achieved with air horn 400. For example, different ground pests respond to different frequencies. An electromagnetic speaker horn 450 can provide much wider frequencies. The system horn 450 includes voice coil 460, planar horn diaphragm 462, horn waveguide 470 and frame structure 463. The powered audio signal 461 is fed into voice coil 460 to generate powerful sound waves 455 to perform the same purposes as system air horn 400.

FIG. 3A is a compressed air operated horn used for dislodging pests from plants and extinguishing small fires at a close distance in accordance with an embodiment of the present disclosure. The compressed air horn includes a compression diaphragm 410, a compressed air hose 411, a compressed air channel 412, compressed air chambers 413 and a compressed air waveguide 420. The waves of compressed air leaving the waveguide have a variable periodicity harmonic to dislodging pests from plants and extinguishing small fires at a distance.

FIG. 3B is a voice coil operated electromagnetic speaker horn for dislodging pests from plants and extinguishing small fires at a close distance in accordance with an embodiment of the present disclosure. The speaker horn 450 includes a voice coil 460, an input wave form 461, a planar diaphragm 462 and frame 463. The audio power amplification plus and minus lead hookups enable higher amplification with higher input power.

Turning to FIG. 4, an infrasound device 500 is mounted via a bracket 501 to drone body 10 to evict subterranean agricultural pests in accordance with an embodiment of the present disclosure. Device 500 includes a throttle body 506 that houses a throttle plate 505 supported with a throttle shaft 504. The shaft 504 is connected to shaft driver 507. The movement speed and direction of driver 507 is controlled by the electromechanical converter 508. The converter 508 can be a voice coil or a single directional motor or a bi-directional motor. When the device 500 is in action, it hovers proximal to a soil surface. Sending audio power signals to voice motor 508 causes the plate 505 to move in a direction as shown per arrow 503. The high pressure, down draft wind 502 produced from propellers 51 passes through the throttle body 506 and plate 505. The frequency and amplitude of the generated infrasound 510 are dependent on the input audio signals. The infrasound 510 travels downward shown by arrow 511 and hits the ground. Small subterranean farm pests, such as rats, weasels, snakes, centipedes and the like have been known to perceive the infrasonic waves going through the earth by natural disasters and interpret these as an early warning to flee the area.

FIG. 4A is an exemplary infrasound machine 530 powered by a fan motor 531. By varying a pitch 555 of the fan blades 533 shown in FIG. 4B, the infrasound frequency 544 is changed. The period lambda is also changed by the fan blade 533 pitch.

FIG. 4B shows a method to produce infrasound by adjusting the pitch angle on the fan blades while the fan is spinning in accordance with an embodiment of the present disclosure. The pitch 555 round the fan blade axis is indicated by the bidirectional circular arrow. The arrow 545 indicates a clockwise rotation but a counterclockwise rotation is also used with a reverse pitch 555 on the fan blades.

Turning to FIG. 5, a plant pollinator drone 600 includes a vibration curtain made of vanes sweeping across plants to mimic visiting bees to cause plants to release their pollens in accordance with an embodiment of the present disclosure. The pollinator drone 600 includes a vibration curtain which is formed with a plurality of elongated vanes 620. Each vane 620 has a reinforcing flat piece of spring material 621 laminated between the vanes 620. All the vanes 620 affixed along a curtain bar 630 are mounted across the bottom of drone 10. The vane 620 has its width so much wider than its body thickness to eliminate the vanes being tangled with each other and eliminates self-forming knots when in operation. Two voice coils 668 operate the electromagnet shaker module 644 attached on either end of the curtain bar 630. The drone 600 hovers over plants in order to gently lower the curtain vanes 620 onto the plants while the drone 600 is moving as shown by arrow 631 on FIG. 5C.

Some plants do not release their pollens until the correct mechanical vibration is detected. The voice coil 668 can produce a wide range of mechanical vibration to match different plants. FIG. 5A is side view of a stationary curtain vane 620 and FIG. 5B is a side view when the vane 620 is in vibration motion in accordance with an embodiment of the present disclosure. Reference numbers used in FIG. 5 above refer to the same and similar limitations of succeeding drawings. FIG. 5C show the pollinator drone moving and transferring vibrations to the plants in accordance with an embodiment of the present disclosure. The plant is caused to vibrate and disperse pollen. FIG. 5D is a shaker module powered by an audio signal through a voice coil similar to a speaker in accordance with an embodiment of the present disclosure. The audio signal is amplified electronically and transduced into an air compressed audio signal.

FIG. 6 illustrates a Hailstone cannon drone system 700 equipped with combustible gas powering the cannons via powerful sonic shockwaves which break up cloud formation to prevent hailstones in accordance with an embodiment of the present disclosure. System 700 includes two hailstone cannons 780 for better balance during flight. The cannon 780, comprises a neck 786, mouth 784 and a combustion chamber 781. A gas tank 783 delivers fuel gas 770 via hose 782. Gas can be any type listed in 770 but other gases and the like can be used. The hailstone cannon drone 700 is radio linked to local weather stations which track the movement of possible hailstone formations in their early stages. Once confirmed, the drone system 700 flies up to meet the cloud 710. The drone system 700 bombards the cloud formation 710 by detonating the acetylenes gas 770 in its combustion chamber 781. The detonated gas rushes out from its mouth 784 travelling into the cloud 710 at one third the speed of sound. This high velocity sonic shockwaves 788 push and disperses the cloud 710 to prevent hailstones from forming.

FIG. 6A illustrates the forming of sonic shockwave blast and a rolling vortex ring 789 in accordance with an embodiment of the present disclosure. The rolling vortex rings form eddies of destructive sound at the edges of the expanding shock blast. Rolling vortex rings also form traveling in an opposite direction in reaction to the rolling vortex rings depicted.

FIG. 6B is a side view showing a travelling vortex ring 789, sonic gas flow 799 and shockwave 788 in accordance with an embodiment of the present disclosure. Similar and same reference numbers used in other drawings indicate same and similar limitations. Shock wave 788 is bounded by the destructive eddies at the edges of the shock wave 788. Initial cavitation 799 is dissipated by the attenuated shock wave as it travels from the mouth 784. The mouth of the cannon 784 is shaped to control the formation of the eddies and the dissipation of the cavitation.

Figure 7:
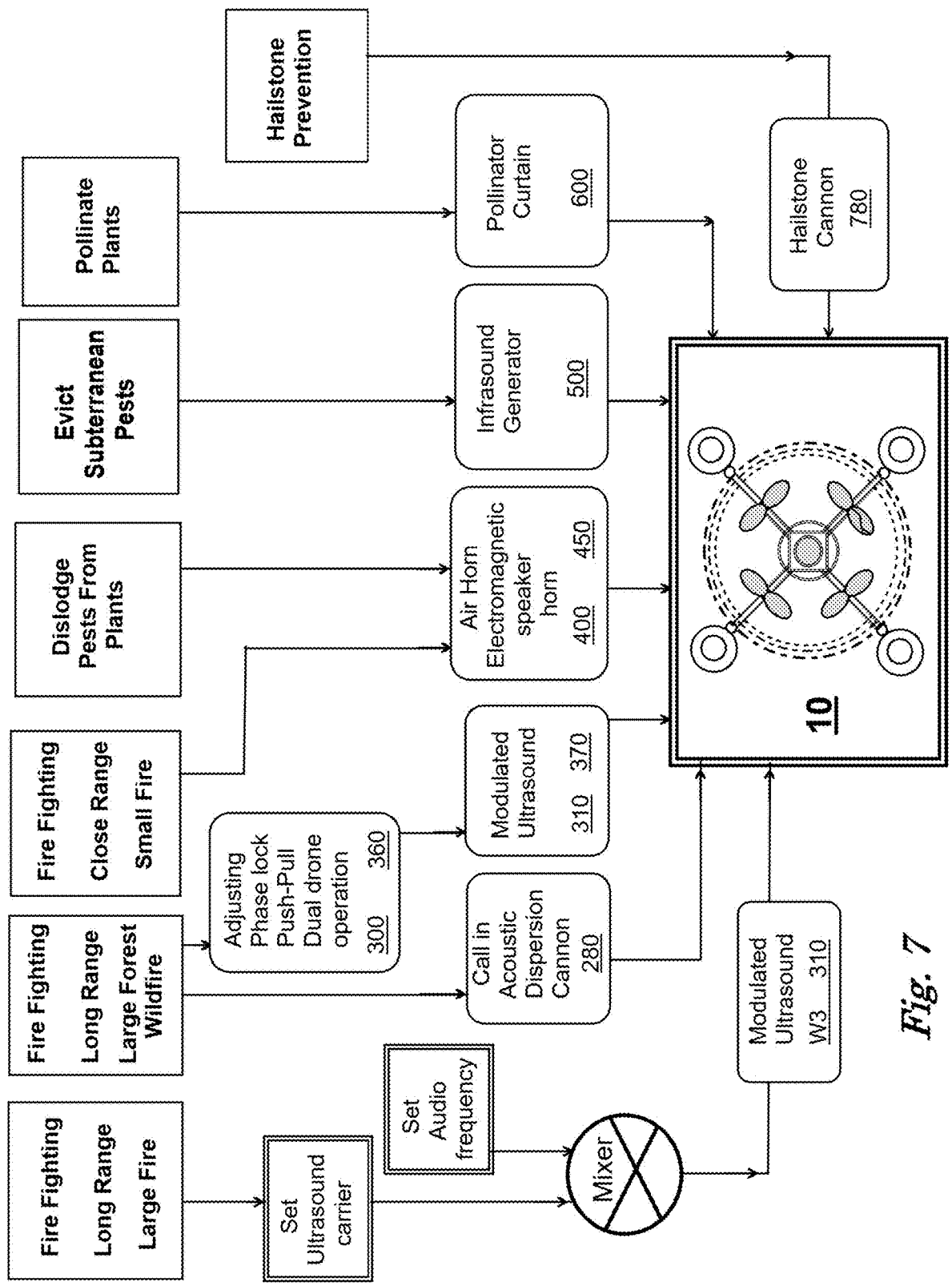
FIG. 7 is a diagram showing various functions the disclosure performs in accordance with an embodiment of the present disclosure.

FIG. 7 shows multiple functions performed with the present disclosure in accordance with an embodiment of the present disclosure. The functions include fire-fighting long range, close range, small fires and large fires such as forest fires. The functions also include dislodging pets from plants, evicting subterranean pests, pollinating plants, hailstone prevention and opposite phase push-pull dual drone operation. The module components include a mixer for set ultrasound and set audio frequencies, modulated ultrasound generator, acoustic dispersion cannons, an ultrasound generators, air horn and electromagnetic planar speaker horns, infrasound generators, pollinator curtains and hailstone cannons.

Because the phase angle from the two resultant audio waves generated from two opposing drones may not perfectly out of phase, the phase angle difference is variable via one or the other of the two drones. Also, two or more radio linked drones in synchrony produce self-demodulated audio waves having phases tunable to boost fire-fighting efficacy.

The consumer version of the disclosed firefighting drone is stationed inside a house. Firefighting drones take off autonomously to extinguish fire when detected or commanded from an owner through Wi-Fi connection. For a small fire inside a house only the ultrasound fire drone is required. The Acoustic Dispersion Cannon is optional. The combined ultrasound drone and acoustic dispersion drone are for forest wildfire application. The disclosure describes a high power modulated ultrasound wave generator drone aimed at a flaming target until the flame extinguished. The disclosed drone also positions the Acoustic Dispersion Cannon module to blast combustible sources with sonic shockwaves to prevent re-ignition of the fire.

A lineup and an array of firefighting drones are used to fight large fires. Tens and even hundreds of firefighting drones are used to fight intense heat fires including chemical fires and atomic fires. Multiple firefighting drones acting in concert, preprogramed and remotely controlled are able to deliver more powerful acoustical waves and larger wave fronts and variable frequency waves to overcome diffraction limits by varying a distance between drones.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. An unmanned aerial vehicle drone (UAVD) system, comprising:
   at least one unmanned UAVD;
   a sound wave generator configured to direct sound waves from at least one planar diaphragm speaker and waveguide to produce a directional parametric sonic wave onto a flaming source to extinguish the flame via compression waves and rarefaction waves configured to push and pull the flame faster than the source can maintain the flame;
   a sound wave controller module configured to control the sound wave generator to generate one of a fire extinguishing frequency, a harmonic frequency for disruption of insect pests, rodents and subterranean pests, hailstones formation and for pollinating plants by vibration;
   a control and communications module comprising an electronic central processing unit (CPU), a wireless communication unit, an electronic camera and an audio A/V unit;
   a navigation module comprising a set of 360 degree obstacle avoidance sensors and positioning unit (GPS) configured to autonomously direct the at least one unmanned UAVD to avoid obstacles while in flight; and
   a bus configured to interconnect the sound wave controller module, the control and communications module and the navigation module.

2. The unmanned UAVD system of claim 1, further comprising two unmanned UAVDs configured to hover, spaced apart and blast modulated ultrasound beams from opposite directions in a bridge mode push-pull fashion onto the same flaming target to speedily extinguish the flame.

3. The unmanned UAVD system of claim 1, further comprising a line up and an array of a plurality of unmanned UAVDs hovering and spaced apart in a coordinated blasting of modulated ultrasound beams in a push-pull fashion onto multiple fire targets to extinguish the multiple fire targets.

4. The unmanned UAVD system of claim 1, further comprising a plurality of unmanned UAVDs hovering and spaced farther apart farther than a wavelength of a sonic blast to avoid a diffraction limit in bridge mode push-pull fashion onto the same flaming target to extinguish the flame.

5. The unmanned UAVD system of claim 1, wherein the sound wave controller module is configured to generate a self-demodulated new lowered frequency audio wave from a plurality of sound waves.

6. The unmanned UAVD system of claim 1, wherein the sound wave generator and the sound wave controller module are modular and removable and configurable in a cartridge form and connect with the UAVD in an electromechanical docking port.

7. The unmanned UAVD system of claim 1, wherein the sound wave controller module is configured to drive the sound wave generator to create audible sound from inaudible sound based on a non-linear and passive demodulated heterodyning air impedance.

8. The unmanned UAVD system of claim 1, further comprising an acoustic dispersion cannon module comprising a fuel tank of combustible gas configured to detonate and create sonic shock waves and extinguish a fire.

9. The unmanned UAVD system of claim 1, further comprising an air horn and an electromagnetic speaker horn configured to dislodge pests from plants and to extinguish fires.

10. The unmanned UAVD system of claim 1, wherein the sound wave generator comprises the at least one planar diaphragm speaker aided by a plurality of wave guides configured to generate a sound wave via a compressed air source and a controllable planar diaphragm.

11. The unmanned UAVD system of claim 10, wherein the sound wave generator comprises an array of planar diaphragm speakers and waveguides designed to produce a directional parametric sonic wave.

12. The unmanned UAVD system of claim 1, wherein the sonic wave generator generates a ring vortex shockwave and destructive sonic eddies from a shape of a sonic wave generator horn.

13. The unmanned UAVD system of claim 1, further comprising a vibration curtain of elongated vanes attached to a bar caused to vibrate via at least one electromechanical voice coil, the curtain of vanes configured to sweep across plants to mimic visiting bees to cause plants to release their pollens.

14. The unmanned UAVD system of claim 1, further comprising a sonic throttle body and a sonic throttle plate configured for sonically modulating a high velocity air current therefrom and by hovering near a surface of the earth, generating a subterranean pest evicting sonic blast.

15. The unmanned UAVD system of claim 1, wherein the sound wave generator comprises an array of sonic transducers designed to produce a directional parametric sonic array.

16. An Unmanned Aerial Vehicle Drone (UAVD) method, comprising:
   generating directional parametric sound waves from at least one planar diaphragm speaker directly via a waveguide onto a flaming source via a sonic wave generator to extinguish the flame via compression waves and rarefaction waves configured to push and pull the flame faster than the source can maintain the flame;
   controlling a sound wave via a sound wave controller configured to generate one of a fire extinguishing frequency, a harmonic frequency for disruption of insect pests, rodents and subterranean pests, hailstones formation and for pollinating plants by vibration;
   controlling a communications of the UAVD via a controlling and a communications module comprising an electronic central processing unit (CPU), a wireless communication unit, an electronic camera and audio an A/V unit;

navigating the UAVD via a navigation module comprising a set of 360 degree obstacle avoidance sensors and positioning unit (GPS) configured to autonomously direct the unmanned UAVD to avoid obstacles while in flight; and interconnecting the sound wave controller module, the control and communications module and the navigation module via a bus.

17. The method of claim 16, further comprising blasting combustible sources with sonic shockwaves via an Acoustic Dispersion Cannon to prevent re-ignition of the fire.

18. The method of claim 16, further comprising demodulating ultrasonic waves from the sound waves into audio waves with a variable frequency and variable amplitude to cause insect pests, including caterpillars, to die based on a body resonation with a frequency of the sonic waves.

\* \* \* \* \*